United States Patent
Mounaguruswamy (10) Patent No.: US 10,673,878 B2
(45) Date of Patent: Jun. 2, 2020

(54) COMPUTER SECURITY APPARATUS

(71) Applicant: INTERNATIONAL BUSINESS MACHINES CORPORATION, Armonk, NY (US)

(72) Inventor: Guruvishnuvardan Mounaguruswamy, Udumalpet (IN)

(73) Assignee: International Business Machines Corporation, Armonk, NY (US)

(*) Notice: Subject to any disclaimer, the term of this patent is extended or adjusted under 35 U.S.C. 154(b) by 570 days.

(21) Appl. No.: 15/158,936

(22) Filed: May 19, 2016

(65) Prior Publication Data
US 2017/0339174 A1    Nov. 23, 2017

(51) Int. Cl.
*G06F 11/00*   (2006.01)
*H04L 29/06*   (2006.01)
*G06F 16/28*   (2019.01)

(52) U.S. Cl.
CPC ........ *H04L 63/1425* (2013.01); *G06F 16/285* (2019.01); *H04L 63/145* (2013.01)

(58) Field of Classification Search
CPC .............. H04L 63/1425; H04L 63/145; G06F 17/30598; G06F 16/285
See application file for complete search history.

(56) References Cited

U.S. PATENT DOCUMENTS

| 7,584,507 | B1 | 9/2009 | Nucci |
| 7,849,507 | B1* | 12/2010 | Bloch ............... H04L 29/12066 726/22 |
| 7,979,844 | B2 | 7/2011 | Srinivasan |
| 8,010,789 | B2 | 8/2011 | Witchey |
| 8,135,655 | B2 | 3/2012 | Oaten et al. |
| 8,176,336 | B1 | 5/2012 | Mao et al. |
| 8,752,179 | B2* | 6/2014 | Zaitsev ............... G06F 21/568 713/188 |

(Continued)

FOREIGN PATENT DOCUMENTS

CN    104601553 A    5/2012

OTHER PUBLICATIONS

Peter Mell et al, The NIST Definition of Cloud Computing, National Institute of Standards and Technology, U.S. Department of Commerce, Special Publication 800-145, 2011.

(Continued)

*Primary Examiner* — Fatoumata Traore
*Assistant Examiner* — Carlton Johnson
(74) *Attorney, Agent, or Firm* — Patrick J. Daugherty; Daugherty & Del Zoppo Co., LPA (57) ABSTRACT

Aspects provide for an automated computer security apparatus. A first sequential action data set of different actions performed sequentially in engaging a computer system to execute a data operation on the computer system is categorized as a normal or abnormal operation. Actions of the first sequential action data set and of another (second) sequential action data set of different actions having the same normal or abnormal category of the first set are randomly selected and combined to generate a random sequential action data set for the common category of the first and second sequential action data sets, to define a sequential order of actions performed sequentially in engaging the computer system to execute a random set data operation on the computer system.

17 Claims, 4 Drawing Sheets

(56) References Cited

U.S. PATENT DOCUMENTS

| | | | |
|---|---|---|---|
| 2011/0004935 A1 | 1/2011 | Moffie et al. | |
| 2012/0222120 A1* | 8/2012 | Rim | G06F 21/566 726/24 |
| 2012/0324575 A1* | 12/2012 | Choi | G06F 21/554 726/23 |
| 2013/0031374 A1 | 1/2013 | Thom et al. | |
| 2013/0304869 A1* | 11/2013 | Gupta | G06F 9/541 709/219 |
| 2014/0082694 A1* | 3/2014 | Sanghavi | G06F 21/31 726/3 |

OTHER PUBLICATIONS

Roland Memisevic, On spatio-temporal sparse coding: Analysis and an algorithm, Department of Computer Science, University of Frankfurt, 2011.

Andrew Ng, Unsupervised Feature Learning and Deep Learning, 2011.

Piotr Dollar et al, Behavior Recognition via Sparse Spatio-Temporal Features, Department of Computer Science and Engineering, University of California, 1973.

Andrew Ng, CS294A Lecture notes, Sparse autoencoder, 2010.

Information Warfare Monitor Shadowserver Foundation, Shadows in the Cloud: Investigating Cyber Espionage 2.0, http://shadows-in-the-cloud.net, 2010.

Virus Bulletin, Flame worm one of the most complex threats ever discovered, https://www.virusbulletin.com, 2012.

Peter Szor, Duqu—Threat Research and Analysis, McAfee Labs, 2011.

Norse, About Us Careers, http://www.norse-corp.com, 2016.

Mandiant, APT1, Exposing One of China's Cyber Espionage Units (Executive Summary section), www.mandiant.com, 2013.

Chester Wisniewski, HBGary Federal hacked and exposed by Anonymous, https://nakedsecurity.sophos.com, 2011.

Gib Sorebo, What the Sony Hack Means for Critical Infrastructure, RSAConference, https://www.rsaconference.com, 2015.

Yinglian Xie, A Spaciotemporal Event Correlation Approach to Computer Security, School of Computer Science, —Carnegie Mellon University (Abstract), 2005.

Colorado State University, Video Event Recognition, Computer Science Department, http://www.cs.colostate.edu, 2012.

* cited by examiner

COMPUTER SECURITY APPARATUS

BACKGROUND

A computer network or data network is a telecommunications network which allows computers to exchange data. In computer networks, networked computing devices exchange data with each other along network links (data connections). Connections between nodes may be established using a variety of mediums, including cable media and wireless media.

Computers are exposed to threats from malicious software ("malware"), software used to disrupt computer operations, gather sensitive information, gain access to private computer systems, or display unwanted advertising. Malware is defined by its malicious intent, acting against the requirements of the computer user, and does not include software that causes unintentional harm due to some deficiency.

Malware may refer to a variety of forms of hostile or intrusive software, including computer viruses, worms, Trojan horses, ransomware, spyware, adware, scareware, and other malicious programs. Stealthy malware may be used to steal information or spy on computer users for an extended period without their knowledge, or it may be designed to cause harm, such as sabotage (for example, "Stuxnet") or to extort payment (for example, "CryptoLocker"). Malware can take the form of executable code, scripts, active content or other software, and is often disguised as, or embedded in, non-malicious files. Malware can impact computer operation in a way deviant from what is expected by a user or owner, and result in unauthorized transfer of intellectual property ("IP") ownership or operations to other entities, leading to loss of information and exposing devices to external environments that result in unsecure computing platform.

BRIEF SUMMARY

In one aspect of the present invention, a method for an automated computer security apparatus executes on a computer processor steps that include creating a first sequential action data set that comprises a plurality of different actions performed sequentially in engaging a computer system to execute a data operation on the computer system. The first sequential action data set is categorized as a normal operation in response to determining that the set of different actions engage the computer system to execute an allowable data operation on the computer system, or as an abnormal operation in response to determining that the plurality of different actions engage the computer system to execute a forbidden data operation on the computer system. Actions of the first sequential action data set and another, second sequential action data set that has the category of the first sequential action data set are randomly selected, wherein the second sequential action data set actions are performed sequentially in engaging the computer system to execute a second data operation on the computer system. Thus, a random sequential action data set is generated for the common category of the first sequential action data set and the second sequential data set by combining the actions selected from the first and second data sets into an order that is performed sequentially in engaging the computer system to execute a random set data operation on the computer system.

In another aspect, a system has a hardware processor in circuit communication with a computer readable memory and a computer-readable storage medium having program instructions stored thereon. The processor executes the program instructions stored on the computer-readable storage medium via the computer readable memory and thereby creates a first sequential action data set that comprises a plurality of different actions performed sequentially in engaging a computer system to execute a data operation on the computer system. The first sequential action data set is categorized as a normal operation in response to determining that the set of different actions engage the computer system to execute an allowable data operation on the computer system, or as an abnormal operation in response to determining that the plurality of different actions engage the computer system to execute a forbidden data operation on the computer system. Actions of the first sequential action data set and another, second sequential action data set that has the category of the first sequential action data set are randomly selected, wherein the second sequential action data set actions are performed sequentially in engaging the computer system to execute a second data operation on the computer system. A random sequential action data set is generated for the common category of the first sequential action data set and the second sequential data set by combining the actions selected from the first and second data sets into an order that is performed sequentially in engaging the computer system to execute a random set data operation on the computer system.

In another aspect, a computer program product for an automated computer security apparatus has a computer-readable storage medium with computer readable program code embodied therewith. The computer readable hardware medium is not a transitory signal per se. The computer readable program code includes instructions for execution which cause the processor to create a first sequential action data set that comprises a plurality of different actions performed sequentially in engaging a computer system to execute a data operation on the computer system. The first sequential action data set is categorized as a normal operation in response to determining that the set of different actions engage the computer system to execute an allowable data operation on the computer system, or as an abnormal operation in response to determining that the plurality of different actions engage the computer system to execute a forbidden data operation on the computer system. Actions of the first sequential action data set and another, second sequential action data set that has the category of the first sequential action data set are randomly selected, wherein the second sequential action data set actions are performed sequentially in engaging the computer system to execute a second data operation on the computer system. A random sequential action data set is generated for the common category of the first sequential action data set and the second sequential data set by combining the actions selected from the first and second data sets into an order that is performed sequentially in engaging the computer system to execute a random set data operation on the computer system.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
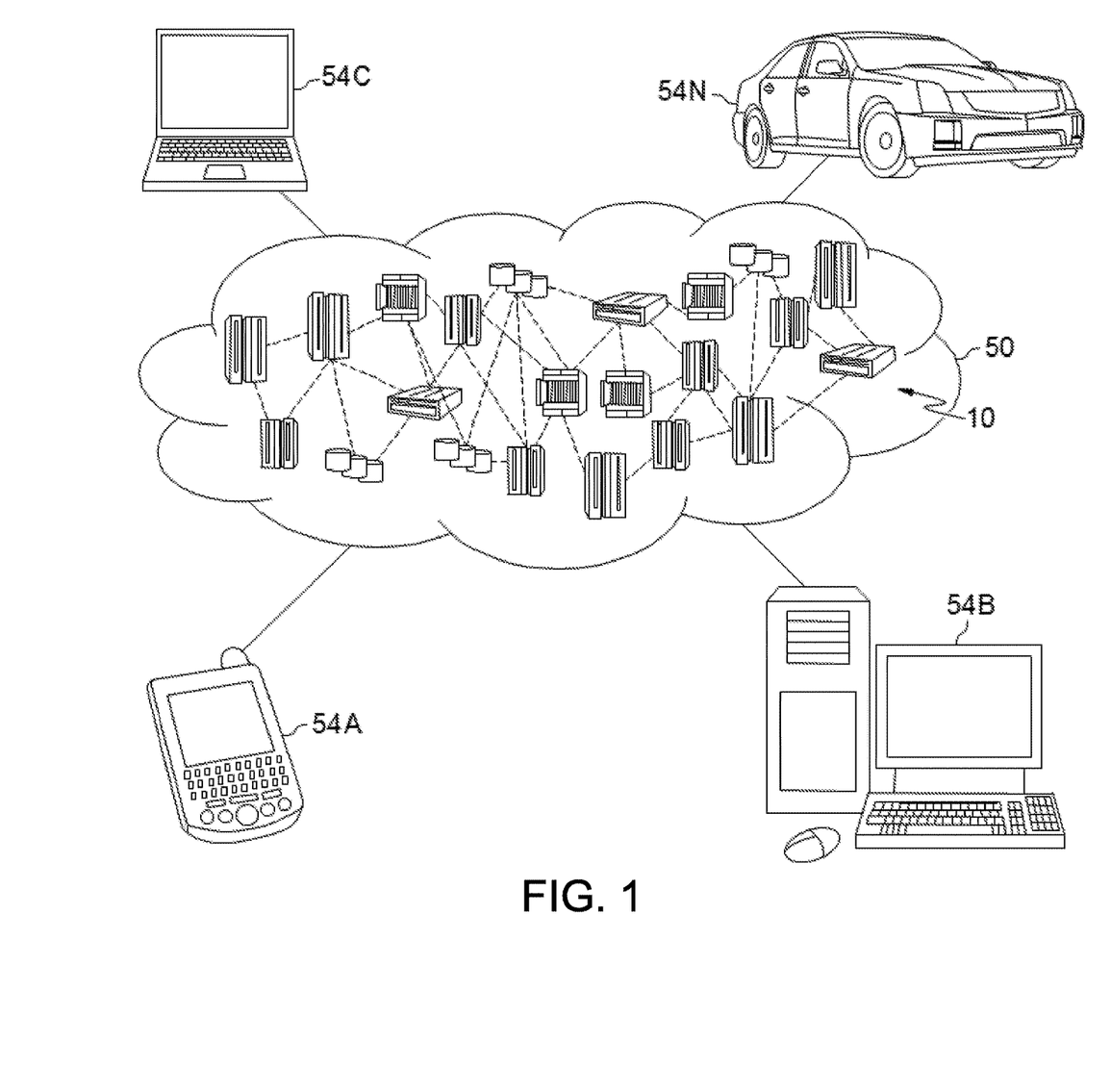
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
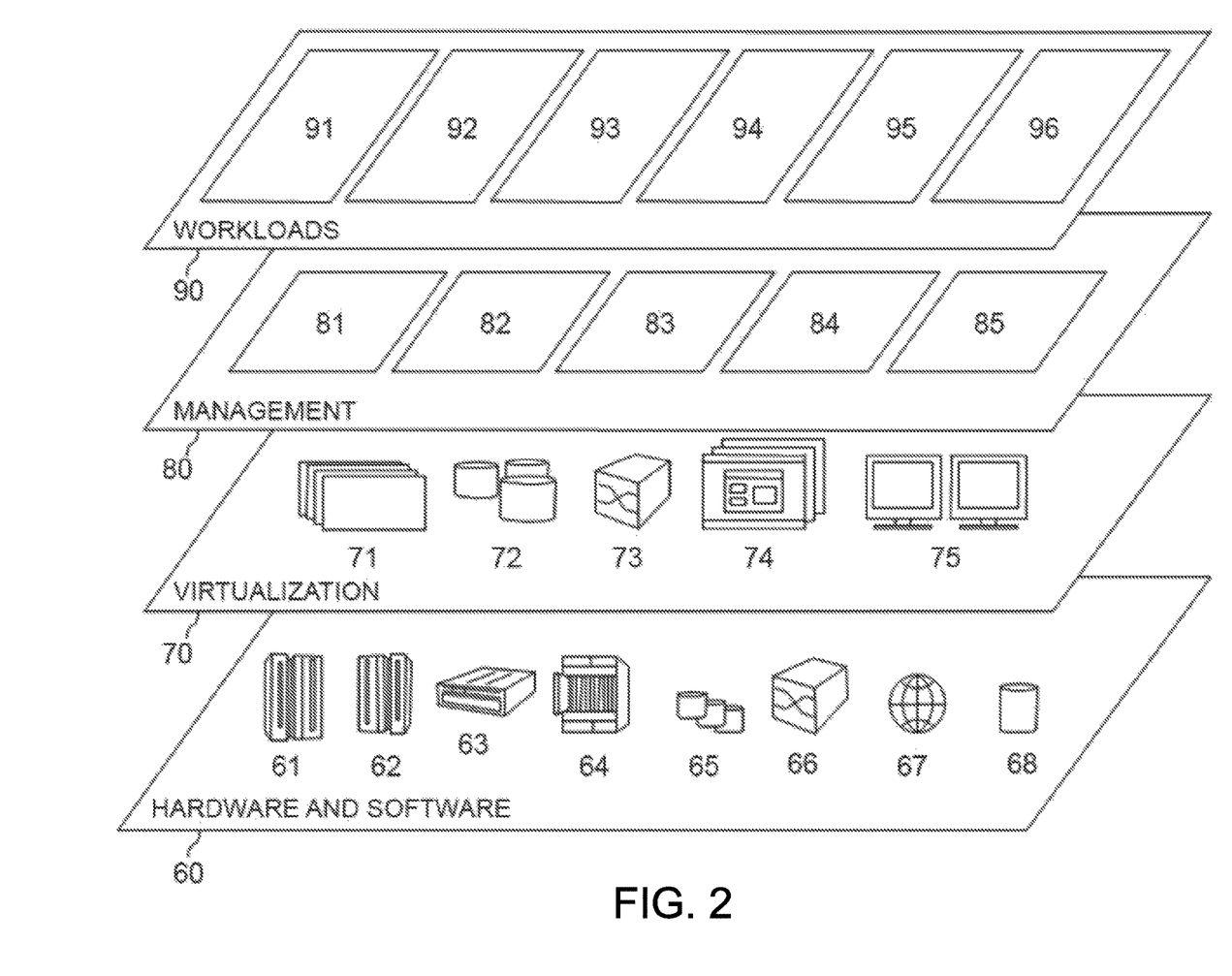
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
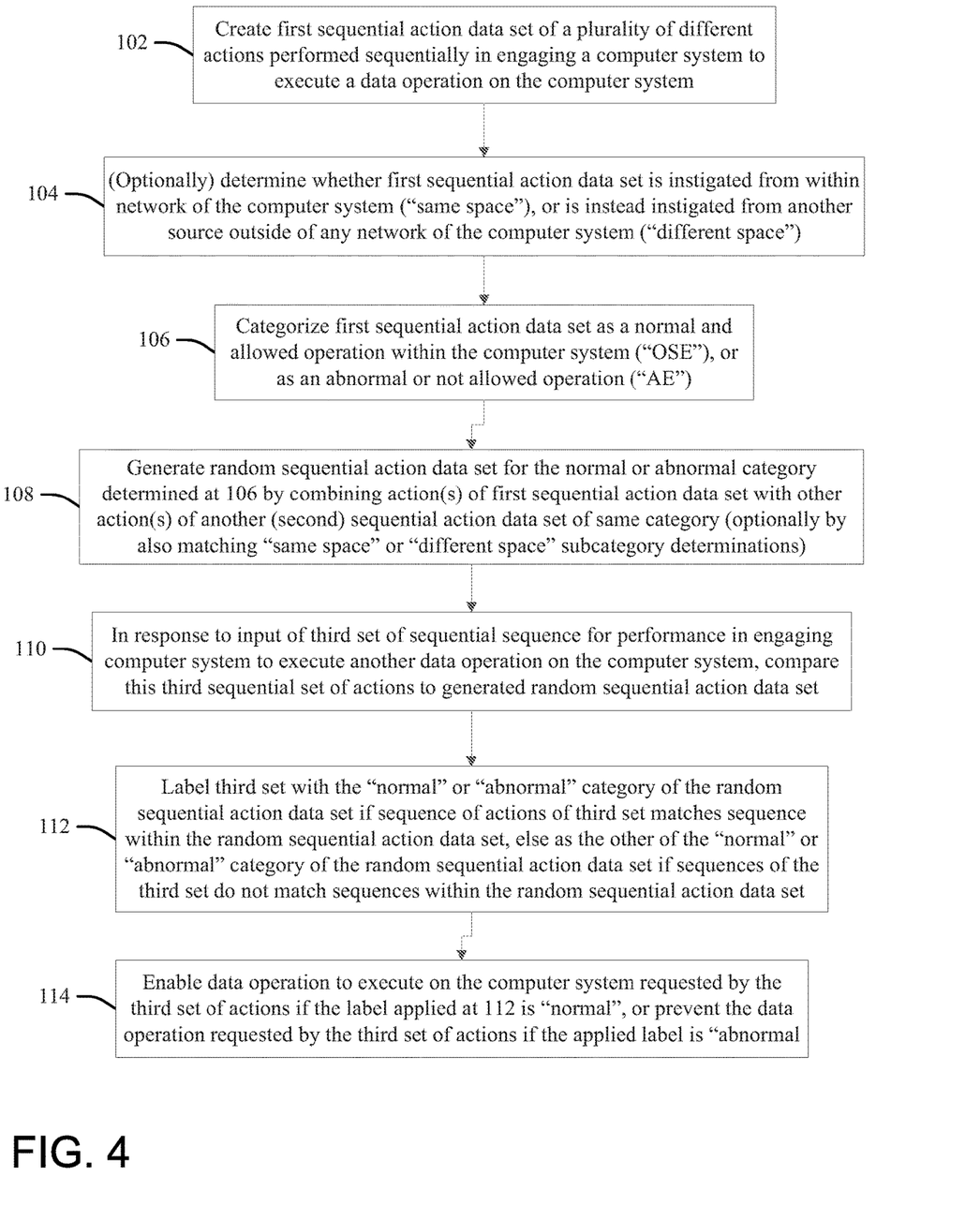
FIG. 4 is a flow chart illustration of an automated computer security apparatus according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for a computer security apparatus according to embodiments of the present invention, for example to execute the process steps or system components or task as depicted in FIG. 4 below.

Figure 3:
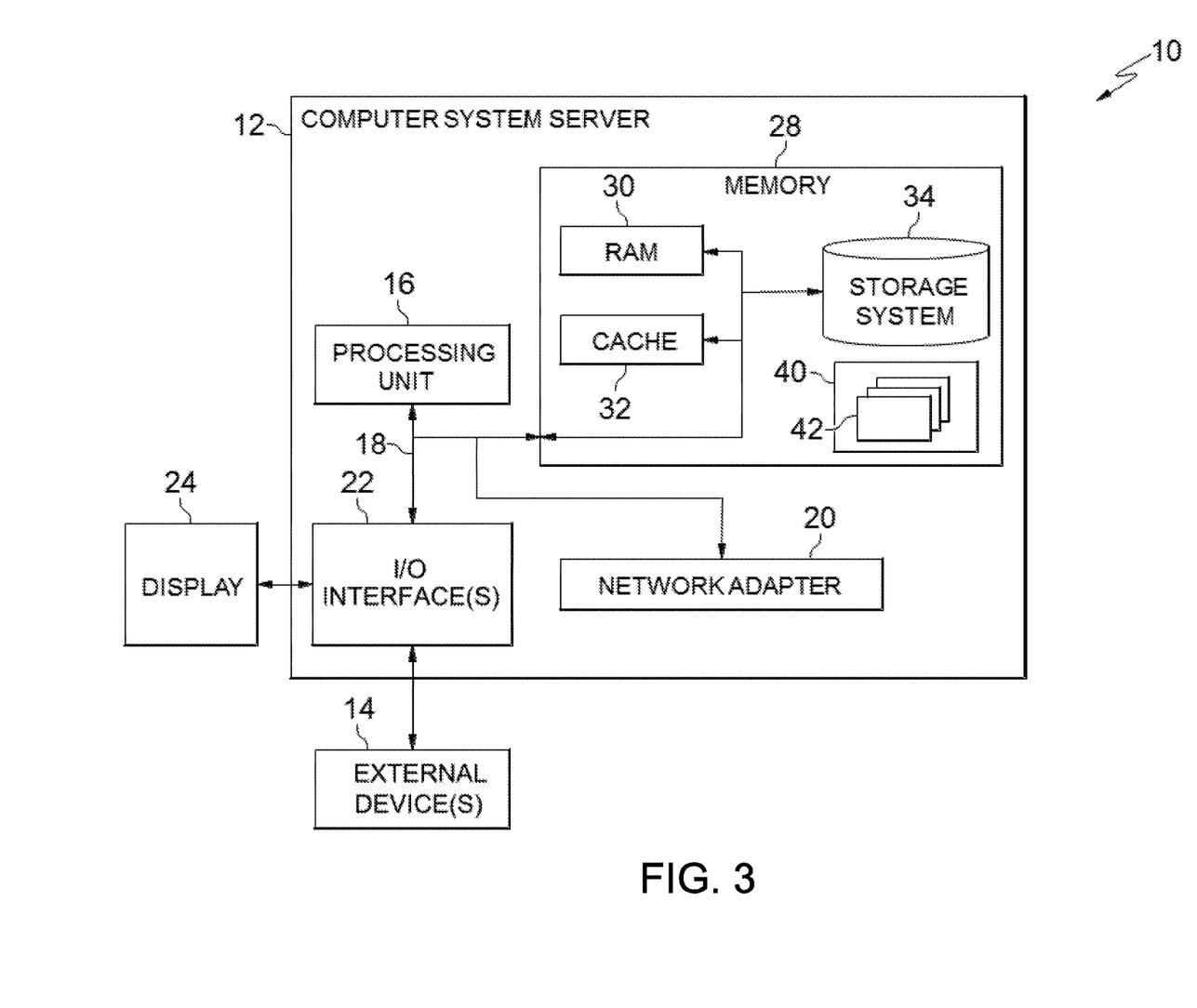
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates one automated computer security apparatus aspect of the present invention wherein at 102 a (first) sequential action data set is created (recorded, saved, videoed, etc.) that comprises a plurality of different actions that are performed sequentially in engaging a computer system to execute a data operation on the computer system. The plurality of different actions of the first set span in time from an initial engagement action with the computer system through a final, terminating action that signifies an end in time of at least a portion of the engagement with the computer system to execute the data operation. Each of the actions differs with respect to spatio-temporal behavioral attributes, namely as to time and/or space points associated with the respective different actions.

At 104, in some illustrative but not limiting or exhaustive examples, the process or system identifies (determines) whether the first sequential action data set is instigated (originated) from within a network of the computer system (within the "same space"of the computer system), or is instead instigated from another source outside of any network of the computer system (from within a "different space" relative to the computer system). For example, if the first, initial action of the first set of sequential actions is an email, chat, text or other communication from an Internet Protocol (IP) address within a network of the computer system, then the process determines at 104 that the first sequential action data set is instigated from within a network or "same space" of the computer system; otherwise, then the process determines at 104 that the first sequential action data set is instigated from outside a network, from a "different space," relative to the computer system. In some examples, the space determination at 104 is a "reverse Domain Name System (DNS) lookup" or "reverse DNS resolution (rDNS)" process, wherein the process or system site performs a reverse DNS lookup of the IP address of the first, instigating action by searching domain name registry and registrar tables. One skilled in the art will appreciate that IP addresses are generally a set of four numbers in the range of 0 to 255 that is separated by periods, and the reverse DNS identifies the domain name of a sender, computer or Internet Service Provider (ISP) of the instigating message.

At 106 the process or system categorizes the first sequential action data as a normal and allowed operation within the computer system (sometimes referred to as an "Operationally Significant Event" or an "OSE"), for example, an authorized request for a user profile change by the user; or as instead a forbidden, abnormal or otherwise not allowed operation (sometimes referred to an "Anomalous Event" or an "AE"), such as a malware insertion or activation or other breach of computer system security.

At 108 the process or system generates a random sequential action data set for the OSE or AE category of the sequential action data set determined at 106, by combining one or more of the actions of the first sequential action data set with one more other actions of another (second) sequential action data set of the same category (normal or abnormal) to generate a sequential set of different actions for that category. In some embodiments, the different data sets are selected as a function of matching "same space" or "different space" sub-category determinations of the respective first and second sequential data sets.

In some embodiments, the generation process at 108 is an internal simulation that determines one or more different combinations of the spatio-temporal events to identify allowed or dis-allowed behavior patterns randomly, as a function of comparing said spatio-temporal behavioral action points to learned spatio-temporal behavioral action point data.

Thus, in response to a subsequent input of another, new (third) sequence of two or more different actions that are performed sequentially in engaging the computer system to execute another data operation on the computer system, at 110 the process or system compares this new (third) sequence of actions to the random sequential action data set generated at 108, and at 112 labels said third sequence with the "normal" or "abnormal" category of the random sequential action data set in response to determining that the actions match a sequence of the sequential actions of the random sequential action data set, or as the other (opposite) one of the "normal" or "abnormal" category of the random sequential action data set in response to determining that the actions do not match a sequence of the sequential actions of the random sequential action data set.

At 114 the process or system processes the new (third) sequence as a function of the "normal" or "abnormal" category label: by enabling or allowing a data operation to execute on the computer system that is requested or otherwise defined by the third sequence of actions if the label applied at 112 is "normal", and by blocking or otherwise preventing the data operation requested or otherwise defined by the third sequence of actions to execute on the computer system if the applied label is "abnormal."

In some aspects, the sequential action data sets are pluralities of different "frames" of actions, wherein each frame may comprise a plurality (or subset) of individual actions that are linked together within each "frame." In one example of an automated computer security apparatus according to the example of FIG. 4, a first frame of a sequential action data set that is determined to be a normal (OSE) operation (at 106) is created (learned) to include an initial (first) engagement action of a user inserting a pen drive into a universal serial bus (USB) port or slot of the computer system, in this example in order to copy files from the pen drive into the computer system. The operating system (OS) of the computer system notifies the automated computer security apparatus of the initiating action, via the message of "New Hardware detected, Loading drivers and Installing." These actions are loaded (stored) to memory to define a first frame (for example, "OSE Lesson 1—Frame 1—PC Connected to Pen Drive," wherein the frame is uniquely identified as "Op1," the frame named or indexed as "Learning OSE.L1.Op1."

A second frame is created and uniquely identified (for example, "OSE Lesson 1—Frame 2—Pen Drive File Copy") wherein the pen drive is designated as "Space S2" by the automated computer security apparatus, and the second frame actions include the user copying a file from the pen drive to a location of the computer system (for example, "C:\User\Admin\Downloads to Personal Computer"). The movement of the file copied is tracked by time and location, for example, "AA Mins: BB Seconds: CC Mille Seconds and File Pasted to Personal Computer @ XX Mins: YY Seconds: ZZ MsMs." These actions are combined into frame 2 of the first data set and stored to memory as "Learning OSE.L1.Op2."

A third data frame is created ("OSE Lesson 1—Frame 3—File Copied") including the actions of copying the file to another location ("File Copied to C:\User\Admin\Downloads in PC (Space S1), receiving notification from the OS about the file copy success and physical memory details. This frame operation is stored to memory as "Learning OSE.L1.Op3."

Actions within a fourth data frame ("OSE Lesson 1—Frame 4—Macro Executes") includes a user's "OnClick ( )" event; a macro execution; notification by the OS of the macro's memory location; the macro opening a webpage (from the same network, identified by DNS from the OS) to add details to a corporate website; a user adding detail to the webpage and saving the webpage; and a copy of the same data is stored in a ".doc" file from where the macro is executed (as notified by the OS). This fourth frame operation is loaded to memory as "Learning OSE.L1.Op4."

In another example, a sequential action data set is created (learned) as "Lesson 2" for determining or differentiating a same space from a different space for a normal (OSE) operation. A first frame ("Frame 1") is created to identify a same space OSE to include actions of a user receiving and opening an email and clicking on a link within the open email of "support.techsupport.org." In a background operation, the process at 104 identifies via a reverse DNS process that the email is from the same network or from the same space as the receiving user, by checking the IP Address of the origination of the sent email, based on the notification from the OS; and/or that the HTTP location of the embedded link clicked on by the user is within the same network or same space as the receiving user. These actions are loaded (stored) to memory to define Frame 1 as "OSE Lesson 2—Frame 1—Learn Same Space", the frame uniquely identified as "Op2" and named or indexed as "Learning OSE.L2.Op1."

A second frame ("Frame 2") which includes the actions of receiving another email is sent to the user, the user opening the email and clicking a link embedded therein of "support-.Microsoft.com." In a background operation, the process at 104 identifies via a reverse DNS process that the email is from a different network or space as the receiving user, by checking the IP Address of the origination of the sent email, based on the notification from the OS; and/or that the HTTP location of the embedded link clicked on by the user is within a different network or space as the receiving user. These actions are loaded (stored) to memory to define Frame 2 as "OSE Lesson 2—Frame 2—Learn Different Space", the frame uniquely identified as "Op2" and named or indexed as "Learning OSE.L2.Op2."

A third frame ("Frame 3") is created (learned) to include user computer system OS detecting three new USB Connections and notifying the security process/system. A background operation determines that three new devices are connected from three different spaces, which are uniquely designated (identified) as "S2, S3, and S4," and said designations are communicated to the OS. The OS further notifies the security process/system that the user copied files from "C:\Downloads" to designated space S2, including notification of actual physical memory locations of all selected and copied files; and that the user pasted an MPEG file from space S3 to "C:\Downloads", including notification of the actual physical memory location of the pasted MPEG file. This third frame is loaded to memory as "Learning OSE.L2.Op3."

"AE Lesson 1—Trojan Stealth Download from Pen Drive" is an example of a sequential action data set for an abnormal (AE). In this example, the operation is determined to be a normal (OSE) operation up to a point in time at which a file copy happens from a pen drive to a drive of the user's computer system. The first frame actions include a copy and paste of a "ReadMe.Doc" file by the user to "C:\User\Downloads" in the user's personal computer, designated as a copy and paste into space "S1" from pen drive space "S2." The user's computer OS notifies the security program/system of the actual physical memory location of the pasted file. During an idle state of the user's system, a Trojan file "Dropper.Win32.Agent.AQCK.Doc" is stealthily downloaded to another location. The OS Notifies the security system/process that a download occurred from the physical memory space of the ReadMe.Doc, and also reports the current physical memory location of the file. These actions are loaded to memory as frame 1, "Learning AE.L1.Op1."

A second frame ("AE Lesson 1—Frame 2") is created comprising execution actions of the "Dropper.Win32.Agent.AQCK.Doc" file, wherein a method "Execute Decrypt ( )" decrypts the Trojan file, and subsequently the dropper drops a payload comprising a plurality of files (in this example, "C:\Windows\Inf\mdmcpq3.PNF," "C:\Windows\Inf\mdmeric3.PNF" and "C:\Windows\Inf\oem6c.PNF"), wherein the OS notifies the security system/process of the payload drop. This second frame of actions is loaded to memory as "Learning AE.L1.Op2."

A third frame of the present example comprises actions with regard to remote access to the computer system attempted by the dropped payload, "AE Lesson 1—Frame 3—Trojan Open Remote Access." In this frame one the decrypted payload file "C:\Windows\Inf\mdmeric3.PNF" makes an attempt to open a back door to download plugins to the user's computer system. In response, the security system/process instructs the OS to block all of the physical memories of all the dropped files involved in the Trojan download and deletes the files permanently from the memory, and the files are cleaned by the OS. The operation defined by this frame of actions is loaded to memory as "Learning AE.L1.Op3."

A fourth frame of the present example comprises actions with regard to another remote access to the computer system attempted by the dropped payload, "AE Lesson 1—Frame 4—Trojan File Copy and Remote Access." Another of the decrypted payload files ("C:\Windows\Inf\oem6c.PNF") attempts to copy a document file and open a back door to download plugins. In response, the security system/process instructs the OS to block all the physical memories of all the files involved in the Trojan download and deletes the files permanently from the memory, with the files cleaned by OS. The operation defined by this frame of actions is loaded to memory as "Learning AE.L1.Op4."

Thus, by combining the four frames of the present AE lesson "L1" the security system/process learns a full sequence of exemplary AE action operations, which it uses to recognize and stop future sets of sequential actions from happening (executing) that match the learned combination and in composite.

In another example, the security system/process learns a data set of actions defining a Distributed Denial of Service ("DDOS") attack, a type of DOS attack where multiple compromised systems, which are each often infected with a Trojan, are used to target a single system with spoofed and legitimate packets to cause the DOS ("AE Lesson 2—Learn Spoofed/Legitimate packets and DDOS learning"). In this set, an attacker tests the user's network with intent to cause DDOS by using legitimate and spoofed IPs in a "dry run," sending specific and empty requests before initiating attacks. In response, the security system/process instructs the user's computer system OS to ping every IP contacting the system to check if it's legitimate or spoofed, wherein a timeout happens if the IP is spoofed, and to identify the geography of the IP Address. This operation set of actions is loaded to memory as "Learning AE.L2.Op1."

In a second frame ("AE Lesson 2—Frame 2—Learn Spoofed/Legitimate packets and DDOS learning"), attackers flood packets using both spoofed IPs and legitimate IPs, which is unusual to any normal OSE circumstance. The OS notifies the security system/process about the legitimate and the spoofed packets, and these actions are combined and loaded to memory as "Learning AE.L2.Op2."

In a third frame ("AE Lesson 2—Frame 3—Learn Spoofed/Legitimate packets and DDOS learning"), as the OS alerted (via the frame 2 actions) the flooded packet IP's are identified as the combination of spoofed and legitimate (since too many hits of packets are detected from different IP Address), and the security system/process instructs the OS to block every individual IP address that is flooding the network traffic, and the security system/process further warns the OS with respect to other traffic from IPs within the geography from where the IP flooding happened. This operation frame of actions is loaded to memory as "Learning AE.L2.Op3."

Aspects of operation data sets may also comprise alternative types of frames. In one example, an abnormal, forbidden operation set comprises both "same space" and "different space" lesson frames. A first frame is created for learning same space actions ("AE Lesson 3—Learn Same Space") wherein a first action is a chat conversation initiated between two individuals ("Steffi" and "John") inside a same network space:

Steffi: "Hey John Wass up, Need pwd, wanna change the new web layout."

In response, John types in an answer: "Hey Steff, its Passw0r$d."

In response to the chat initiation, the security system/process recognizes the term "pwd" as short-hand or jargon for (is equivalent to) the term "password," and thereby categories the chat communication as a request for a password, and further checks for the IP Address (via reverse DNS) of the originating chat message from Steffi as sent from the OS and identifies the original as the same network (space) as John. This frame of operation actions is loaded to memory as "Learning AE.L3.Op1."

A second frame of operation actions is created that is linked to the first frame and includes actions in response to the first frame of actions ("AE Lesson 3—Frame 2—Learn Same Space"). The response actions are selected by the security system/process from the following set of actions: to flag (notify) an administrator ("Admin") about the chat conversation with the chat details, including the respective IP addresses of the chat participants (Steffi and John); to block John from replying with the password in a chat reply in answer, and to send John a message instructing him to reply to Steffi to direct her to contact the Admin directly for satisfaction of the password request; to freeze the webpage hosting the chat conversation and post a warning to Steffi and John informing them that security polices do not allow the sharing or divulgation of passwords in chat communications; and to request that the Admin authorize the revelation of the password to Steffi, in some examples with a warning to the Admin that security policies require the Admin to personally verify that Steffi is authorized to receive the password. This set of operation actions is loaded to memory as "Learning AE.L3.Op2."

A third frame of the set comprises actions with respect to external code communications different spaces/networks ("AE Lesson 3—Frame 3—Learn Different Space (External Code). In this scenario, an attacker compromises a server of the protected system using external code used to bypass a system vulnerability ("exploits"), gaining access to the network and thereby initiating the same or similar chats of AE Lesson 3—Frame 1 with an Admin while posing as an authorized colleague ("Steffi") within the same space as the Admin:

Attacker masked as Steffi: "Hey John Wass up, Need pwd, wanna change the new web layout."

John: "Hey Steff, its Passw0r$d"

In response, the security system/process determines that the chat application has been compromised by an external code from a different space (for example, via reverse DNS), and further determines that the external attacker has used a masked name and is chatting from a different space connected to another space (for example, "S1") identified by the security system/process. These operations are combined and loaded to memory as "Learning AE.L3.Op3."

A fourth frame is created (learned) that is linked to the third frame and that comprises responses by the security system/process to the operation actions of the third, frame 3 ("AE Lesson 3—Frame 4—Learn Different Space (External Code)"). Thus, response actions are selected by the security system/process for use in creating the fourth frame from the following set of actions: alerting an Admin about the breach in network (with complete external DNS Information, for example, determined from reverse DNS); blocking access of the attacker gained by the breach (the external IP's Influence); generating a chat message to or conversation with the Admin providing the IP Addresses of the chat and informing the Admin that it's a "Phishing Attack" on the network, noting that one of the chat users is not from the same network; and blocking all communications from the Network ID of the attacker, from where the attacker gained unauthorized access.

By mixing and matching permissible combinations of the frames of the different learned action sets, aspects of the present invention learn different possible action combinations that may define an attack once a breach happens, wherein sequences of occurrence of the possible action combinations are then recognized in the future, enabling timely and real-time blocking of breaches and improper chats as they occur. Random combinations are used to form new sets of operation actions, which may be tested and simulated, such as through war-gaming scenario systems and processes.

Aspects of the present invention provide advantages over prior art. For example, in contrast to conventional virus protection applications, no periodic signature updates required. Rather, the security processes and systems according to the present invention have the capability to randomly combine frames of actions into new abnormal and normal operation scenarios that may be tested and considered, much like the scenario process of the human brain. Events which are not learned as normal, operational events may be considered in default as forbidden "AE" events, even if the actions defining the particular event are not learned as an AE frame combination during the learning and simulation processes of FIG. 4. Aspects also have seamless interaction with the operating systems of the computer systems being protected, achieving total situational awareness.

Some aspects provide computer security systems designed with the deep learning concepts to provide foolproof autonomous, self learning and reliable security. Inspired by human brain's intelligence and its ability to visualize a scenario or predict an event, some aspects are designed based on spatio-temporal sparse encoding and auto encoder methodologies and based on the concept of deep learning. These aspects are enabled to test random combinations of frames and actions from similar categories of operation action sets to understand and tackle past, present and future security threats. Post learning, such aspects check their abilities to correctly identify operation actions as defining normal or abnormal/forbidden operations, via mimicking objects to simulate simultaneously normal and abnormal/forbidden operations inside a spatio-temporal space of a computer system. Simulation is also used to predict attacks by combining many abnormal/forbidden operation frames and actions.

Spatio-temporal action points are used to validate a particular object's existence in a given space, time and its action. "Space" is where the object is located, for example on a flash drive, pen drive, external HD, DVD, HD, RAM, network, etc. "Time" specifies the movement of the object from one space to another, for example an object copied from an external device to a hard drive, wherein the time element is used only to define the object's movement. "Action" signifies what the object's behavior is, during the learning phase with the help of operation sets of frames a whole computer system may be marked with variables consisting of space, time and action.

Examples of security breaches anticipated and prevented by aspects of the present invention include:

Unauthorized disclosure of a circumstance or event whereby an entity gains access to data for which the entity is not authorized. Threat actions that cause unauthorized disclosure include exposure, a threat action whereby sensitive data is directly released to an unauthorized entity. This includes deliberate exposure, the intentional release of sensitive data to an unauthorized entity; scavenging or searching through data residue in a system to gain unauthorized knowledge of sensitive data; human error, action or inaction that unintentionally results in an entity gaining unauthorized knowledge of sensitive data; and hardware or software error, causing system failure that results in an entity gaining unauthorized knowledge of sensitive data.

Some aspects track and analyze every direct human interaction with a system to identify any AE's.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor the steps of:

defining a first sequential action data set of a plurality of different actions that are performed sequentially in engaging a computer system to execute a first data operation on the computer system to comprise a first-set initial engagement action that initially engages an initial location of the computer system to execute the first data operation, a first-set middle engagement action that engages the computer system after the engagement by first-set initial engagement action to execute the first data operation, and a first-set final terminating action that engages the computer system after the engagement by the first-set middle engagement action and terminates execution of the first data operation by transferring data between the initial location and a first location of the computer system that is different from the initial location;

categorizing the first sequential action data set as a normal category operation in response to determining that the first sequential action data set of the plurality of different actions engage the computer system to execute an allowable data operation on the computer system;

categorizing the first sequential action data set as an abnormal category operation in response to determining that the first sequential action data set of the plurality of different actions engage the computer system to execute a forbidden data operation on the computer system;

randomly selecting one of the actions of the first sequential action data set;

randomly selecting a plurality of actions of a second sequential action data set that has the category of the first sequential action data set, wherein the second sequential action data set comprises a different plurality of actions that are performed sequentially in engaging the computer system to execute a second data operation on the computer system and comprises a second-set initial engagement action that initially engages the computer system initial location to execute the second data operation, a second-set middle engagement action that engages the computer system after the engagement by second-set initial engagement action to execute the second data operation, and a second-set final terminating action that engages the computer system after the engagement by the second-set middle engagement action and terminates execution of the second data operation by transferring data between the initial location and a second location of the computer system that is different from the initial location and from the first location;

generating a random sequential action data set for the category of the first sequential action data set and the second sequential data set by combining the randomly selected plurality of actions into an order that is performed sequentially in engaging the computer system at the initial location to execute a random data set operation on the computer system that comprises transferring data between the initial location and one of the first location and the second location;

in response to an input to a network of the computer system of a third sequential set of different actions that are performed sequentially in engaging the computer system at the initial location to execute a third data operation on the computer system comprising transferring data between the initial location and another location of the computer system that is different from the initial location, comparing the third sequential set of actions to the generated random sequential action data set plurality of actions;

labeling the third sequential set with the normal category or the abnormal category of the random sequential action data set in response to determining that the third sequence of actions matches each of a sequence of the sequential actions of the random sequential action data set; and labeling the third sequential set with a different one of the normal category or the abnormal category of the random sequential action data set in response to determining that the third sequence of actions does not match a sequence of the sequential actions of the random sequential action data set; and wherein the initial, first, second and another locations are each selected from the group consisting of a serial bus port of the computer system, a location defined within a file system of the computer system, a location defined on a memory resource of the computer system, and a location defined by an internet protocol address.

2. The method of claim 1, wherein the transferring data between the initial location and the another location of the computer system comprises granting access to enterprise secure data to a user from an off-site location, pursuant to either of applied security settings and revised security settings, as a service in a cloud environment; and wherein the category of the first sequential action data set and the second sequential data set is normal and the labeling of the third sequential set is abnormal.

3. The method of claim 1, further comprising:

integrating computer-readable program code into a computer system comprising a processor, a computer readable memory and a computer readable storage medium, wherein the computer readable program code is embodied on the computer readable storage medium and comprises instructions that, when executed by the processor via the computer readable memory, cause the processor to perform the steps of defining the first sequential action data set, categorizing the first sequential action data set as the normal operation or as the abnormal operation, randomly selecting the action of the first sequential action data set and the plurality of actions of the second sequential action data set, generating the random sequential action data set for the category of the first sequential action data set and the second sequential data set, comparing the third sequential set of actions to the generated random sequential action data set plurality of actions, and the labeling the third sequential set with the normal category or the abnormal category.

4. The method of claim 1, further comprising:

in response to determining that the first sequential action data set comprises an initiating action that is originated from within a network of the computer system, labeling the first sequential action data set as within a same space of the computer system; and in response to determining that the first sequential action data set initiating action is originated from outside of networks of the computer system, labeling the first sequential action data set as within a different space relative to the computer system; and wherein the step of randomly selecting the plurality of actions of the second sequential action data set is responsive to the second sequential action data set having the same space label or the different space label of the first sequential action data set.

5. The method of claim 4, wherein the first initiating action comprises receiving a communication that is selected from the group consisting of an email, a chat and a text communication, the method further comprising:

determining whether the first sequential action data set initiating action is originated from within or outside of networks of the computer system by performing a reverse domain name system lookup of an internet protocol address of the first instigating action via searching domain name registry and registrar tables.

6. The method of claim 5, further comprising:

recognizing that a term within the first initiating action is equivalent to password;

categorizing the first initiating action as a request for a password in response to the recognizing that that the term within the first initiating action is equivalent to password; and in response to determining that the first initiating action is originated from outside of the networks of the computer system, categorizing the first sequential action data set as the abnormal operation and blocking a response to the first initiating action.

7. The method of claim 1, further comprising:

allowing the third sequential sequence of different actions to engage the computer system to execute the third data operation on the computer system in response to determining that the label of the third sequential set is the normal category; and preventing the third sequential sequence of different actions from engaging the computer system to execute the third data operation on the computer system in response to determining that the label of the third sequential set is the abnormal category.

8. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

defines a first sequential action data set of a plurality of different actions that are performed sequentially in engaging the computer system to execute a first data operation on the computer system to comprise a first-set initial engagement action that initially engages an initial location of the computer system to execute the first data operation, a first-set middle engagement action that engages the computer system after the engagement by first-set initial engagement action to execute the first data operation, and a first-set final terminating action that engages the computer system after the engagement by the first-set middle engagement action and terminates execution of the first data operation by transferring data between the initial location and a first location of the computer system that is different from the initial location;

categorizes the first sequential action data set as a normal category operation in response to determining that the first sequential action data set of the plurality of different actions engage the computer system to execute an allowable data operation on the computer system;

categorizes the first sequential action data set as an abnormal category operation in response to determining that the first sequential action data set of the plurality of different actions engages the computer system to execute a forbidden data operation on the computer system;

randomly selects one of the actions of the first sequential action data set;

randomly selects a plurality of actions of a second sequential action data set that has the category of the first sequential action data set, wherein the second sequential action data set comprises a different plurality of actions that are performed sequentially in engaging the computer system to execute a second data operation on the computer system and comprises a second-set initial engagement action that initially engages the computer system initial location to execute the second data operation, a second-set middle engagement action that engages the computer system after the engagement by second-set initial engagement action to execute the second data operation, and a second-set final terminating action that engages the computer system after the engagement by the second-set middle engagement action and terminates execution of the second data operation by transferring data between the initial location and a second location of the computer system that is different from the initial location and from the first location;

generates a random sequential action data set for the category of the first sequential action data set and the second sequential data set by combining the randomly selected plurality of actions into an order that is performed sequentially in engaging the computer system at the initial location to execute a random data set operation on the computer system that comprises transferring data between the initial location and one of the first location and the second location;

in response to an input to a network of the computer system of a third sequential set of different actions that are performed sequentially in engaging the computer system at the initial location to execute a third data operation on the computer system comprising transferring data between the initial location and another location of the computer system that is different from the initial location, comparing the third sequential set of actions to the generated random sequential action data set plurality of actions;

labeling the third sequential set with the normal category or the abnormal category of the random sequential action data set in response to determining that the third sequence of actions matches each of a sequence of the sequential actions of the random sequential action data set; and labeling the third sequential set with a different one of the normal category or the abnormal category of the random sequential action data set in response to determining that the third sequence of actions does not match a sequence of the sequential actions of the random sequential action data set; and wherein the initial, first, second and another locations are each selected from the group consisting of a serial bus port of the computer system, a location defined within a file system of the computer system, a location defined on a memory resource of the computer system, and a location defined by an internet protocol address.

9. The system of claim 8, wherein the processor executes program instructions stored on the computer-readable storage medium via the computer readable memory and thereby further:

in response to determining that the first sequential action data set comprises an initiating action that is originated from within a network of the computer system, labels the first sequential action data set as within a same space of the computer system; and in response to determining that the first sequential action data set initiating action is originated from outside of networks of the computer system, labels the first sequential action data set as within a different space relative to the computer system; and wherein the processor randomly selects the plurality of actions of the second sequential action data set in response to the second sequential action data set having the same space label or the different space label of the first sequential action data set.

10. The system of claim 9, wherein the first initiating action comprises receiving a communication that is selected from the group consisting of an email, a chat and a text communication; and wherein the processor executes program instructions stored on the computer-readable storage medium via the computer readable memory and thereby further determines whether the first sequential action data set initiating action is originated from within or outside of networks of the computer system by performing a reverse domain name system lookup of an internet protocol address of the first instigating action via searching domain name registry and registrar tables.

11. The system of claim 10, wherein the processor executes program instructions stored on the computer-readable storage medium via the computer readable memory and thereby further:

recognizes that a term within the first initiating action is equivalent to password;

categorizes the first initiating action as a request for a password in response to the recognizing that that the term within the first initiating action is equivalent to password; and in response to determining that the first initiating action is originated from outside of the networks of the computer system, categorizes the first sequential action data set as the abnormal operation and blocking a response to the first initiating action.

12. The system of claim 8, wherein the processor executes program instructions stored on the computer-readable storage medium via the computer readable memory and thereby further:

allows the third sequential sequence of different actions to engage the computer system to execute the third data operation on the computer system in response to determining that the label of the third sequential set is the normal category; and prevents the third sequential sequence of different actions from engaging the computer system to execute the third data operation on the computer system in response to determining that the label of the third sequential set is the abnormal category.

13. A computer program product, comprising:

a computer readable storage medium having computer readable program code embodied therewith, wherein the computer readable storage medium is not a transitory signal per se, the computer readable program code comprising instructions for execution by a processor that cause the processor to:

define a first sequential action data set of a plurality of different actions that are performed sequentially in engaging the computer system to execute a first data operation on the computer system to comprise a first-set initial engagement action that initially engages an initial location of the computer system to execute the first data operation, a first-set middle engagement action that engages the computer system after the engagement by first-set initial engagement action to execute the first data operation, and a first-set final terminating action that engages the computer system after the engagement by the first-set middle engagement action and terminates execution of the first data operation by transferring data between the initial location and a first location of the computer system that is different from the initial location;

categorize the first sequential action data set as a normal category operation in response to determining that the first sequential action data set of the plurality of different actions engage the computer system to execute an allowable data operation on the computer system;

categorize the first sequential action data set as an abnormal category operation in response to determining that the first sequential action data set of the plurality of different actions engage the computer system to execute a forbidden data operation on the computer system;

randomly select one of the actions of the first sequential action data set;

randomly selects a plurality of actions of a second sequential action data set that has the category of the first sequential action data set, wherein the second sequential action data set comprises a different plurality of actions that are performed sequentially in engaging the computer system to execute a second data operation on the computer system and comprises a second-set initial engagement action that initially engages the computer system initial location to execute the second data operation, a second-set middle engagement action that engages the computer system after the engagement by second-set initial engagement action to execute the second data operation, and a second-set final terminating action that engages the computer system after the engagement by the second-set middle engagement action and terminates execution of the second data operation by transferring data between the initial location and a second location of the computer system that is different from the initial location and from the first location;

generate a random sequential action data set for the category of the first sequential action data set and the second sequential data set by combining the randomly selected plurality of actions into an order that is performed sequentially in engaging the computer system at the initial location to execute a random set data operation on the computer system that comprises transferring data between the initial location and one of the first location and the second location;

in response to an input to a network of the computer system of a third sequential set of different actions that are performed sequentially in engaging the computer system at the initial location to execute a third data operation on the computer system comprising transferring data between the initial location and another location of the computer system that is different from the initial location, compare the third sequential set of actions to the generated random sequential action data set plurality of actions;

label the third sequential set with the normal category or the abnormal category of the random sequential action data set in response to determining that the third sequence of actions matches a sequence of the sequential actions of the random sequential action data set; and label the third sequential set with a different one of the normal category or the abnormal category of the random sequential action data set in response to determining that the third sequence of actions does not match a sequence of the sequential actions of the random sequential action data set; and wherein the initial, first, second and another locations are each selected from the group consisting of a serial bus port of the computer system, a location defined within a file system of the computer system, a location defined on a memory resource of the computer system, and a location defined by an internet protocol address.

14. The computer program product of claim 13, the computer readable program code comprising instructions for execution by the processor that further cause the processor to:

in response to determining that the first sequential action data set comprises an initiating action that is originated from within a network of the computer system, label the first sequential action data set as within a same space of the computer system; and in response to determining that the first sequential action data set initiating action is originated from outside of networks of the computer system, label the first sequential action data set as within a different space relative to the computer system; and wherein the processor randomly selects the plurality of actions of the second sequential action data set in response to the second sequential action data set having the same space label or the different space label of the first sequential action data set.

15. The computer program product of claim 14, wherein the first initiating action comprises receiving a communication that is selected from the group consisting of an email, a chat and a text communication; and the computer readable program code comprising instructions for execution by the processor that further cause the processor to determine whether the first sequential action data set initiating action is originated from within or outside of networks of the computer system by performing a reverse domain name system lookup of an internet protocol address of the first instigating action via searching domain name registry and registrar tables.

16. The computer program product of claim 15, the computer readable program code comprising instructions for execution by the processor that further cause the processor to:
recognize that a term within the first initiating action is equivalent to password;
categorize the first initiating action as a request for a password in response to the recognizing that that the term within the first initiating action is equivalent to password; and
in response to determining that the first initiating action is originated from outside of the networks of the computer system, categorize the first sequential action data set as the abnormal operation and blocking a response to the first initiating action.

17. The computer program product of claim 13, the computer readable program code comprising instructions for execution by the processor that further cause the processor to:
allow the third sequential sequence of different actions to engage the computer system to execute the third data operation on the computer system in response to determining that the label of the third sequential set is the normal category; and
prevent the third sequential sequence of different actions from engaging the computer system to execute the third data operation on the computer system in response to determining that the label of the third sequential set is the abnormal category.

* * * * *

UNITED STATES PATENT AND TRADEMARK OFFICE
CERTIFICATE OF CORRECTION

PATENT NO. : 10,673,878 B2
APPLICATION NO. : 15/158936
DATED : June 2, 2020
INVENTOR(S) : Mounagurusamy Guruvishnuvardan Page 1 of 1

It is certified that error appears in the above-identified patent and that said Letters Patent is hereby corrected as shown below:

On the Title Page

Item (72) should read MOUNAGURUSAMY GURUVISHNUVARDAN

Signed and Sealed this
Eighteenth Day of August, 2020

Andrei Iancu
*Director of the United States Patent and Trademark Office*